United States Patent
Fuge

(10) Patent No.: US 6,941,671 B2
(45) Date of Patent: Sep. 13, 2005

(54) PROBE TRIGGERING

(75) Inventor: Jonathan Paul Fuge, Bristol (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/488,207

(22) PCT Filed: Sep. 5, 2002

(86) PCT No.: PCT/GB02/04020
§ 371 (c)(1),
(2), (4) Date: Mar. 1, 2004

(87) PCT Pub. No.: WO03/021182
PCT Pub. Date: Mar. 13, 2003

(65) Prior Publication Data
US 2004/0200086 A1 Oct. 14, 2004

(30) Foreign Application Priority Data
Sep. 5, 2001 (GB) ............................. 012420
May 24, 2002 (GB) ............................. 0212013

(51) Int. Cl.⁷ ............................................ G01B 7/28
(52) U.S. Cl. ............................................. 33/558
(58) Field of Search ................................. 33/558, 561

(56) References Cited
U.S. PATENT DOCUMENTS 4,153,998 A    5/1979  McMurtry ............... 33/561
4,177,568 A  * 12/1979  Werner et al. ........... 33/561
4,769,919 A    9/1988  Lloyd et al. ............. 33/558
5,425,180 A  *  6/1995  Breyer .................... 33/503
5,435,072 A  *  7/1995  Lloyd et al. ............. 33/559
5,671,542 A    9/1997  Zannis et al. ............ 33/561
6,131,301 A  * 10/2000  Sutherland .............. 33/561
6,487,785 B1 * 12/2002  Ritz ....................... 33/561
6,708,420 B1 *  3/2004  Flanagan ................. 33/556
6,718,647 B2 *  4/2004  Trull et al. ............. 33/558

FOREIGN PATENT DOCUMENTS

EP      0 420 305 A2    4/1991
EP      0 605 140 A1    7/1994
EP      0 695 926 A1    2/1996

* cited by examiner

Primary Examiner—Christopher W. Fulton
(74) Attorney, Agent, or Firm—Oliff & Berridge PLC

(57) ABSTRACT

A touch-trigger probe is described having a workpiece-contact sensor (15) in the form of a kinematic seating (10) and workpiece contacting stylus (12). A processor μP in the form of a reprogammable PIC microcontroller is used to monitor the signal from the sensor (15). When the signal is above a threshold for a continual period of time (CT) then the processor issues a trigger signal. The monitoring of the time period (Ct) may be delayed. This delay (Ci) allows triggering initiated by the shock wave produced initially when workpiece contact occurs.

15 Claims, 4 Drawing Sheets

PROBE TRIGGERING

This invention relates to trigger probes of the type used on position determining apparatus, such as coordinate measuring machines (CMM) and machine tools.

Such probes have a deflectable workpiece-contacting stylus. When the stylus makes contact with a workpiece, a trigger signal is issued to the position determining apparatus, to cause it to take a reading of the position of the probe. The probe may have, for example, kinematic electrical contacts which change state when the stylus touches the workpiece. U.S. Pat. No. 4,153,998 describes one example of such a probe, having three sets of contacts wired in series, which are normally closed. When the stylus comes into contact with the workpiece one or more of the electrical contacts opens to generate the trigger signal.

FIG. 1 shows schematically such a probe 10. In normal use, the probe 10 is connected to an interface circuit 2. Such an interface 2 conventionally contains a resistor R1 in series with the contacts of the probe 10 between a positive supply rail +V and a ground rail 0V. A line 6 from an input terminal 4 between the resistor R1 and the probe 10 is connected to a comparator circuit 7. When the contacts of the probe 10 are closed (i.e. the normal state) the line 6 is connected to the 0V rail. When the stylus of the probe 10 contacts the workpiece, its contacts start to open and the resistance across them increases. The contact resistance is then sensed in a voltage divider arrangement with the resistor R1, and the comparator 7 generates the trigger signal when the contact resistance rises through a predetermined threshold.

A problem can arise if the position determining apparatus on which the probe 10 is mounted is subject to vibration, which is often so in the case of machine tools. The vibration acting on the stylus of the probe 10 can cause tiny movements at the electrical contacts, resulting in momentary increases in the contact resistance (called contact bounce). If the contact resistance should rise momentarily above the threshold detected by the comparator 7, false trigger signals can be generated as a result.

European Patent Nos. 420,305 and 695,926 disclose further probes, in which a capacitor is placed in parallel with the probe contacts as part of a circuit to prevent false triggering due to contact bounce. In combination with the resistor R1, the capacitor forms an R.C. filtering circuit and provides a time delay before the voltage across the contacts rises. This delay reduces false triggers.

These switch type probes having the R.C. filtering circuit described above can be set up to exclude contact bounces which occur briefly. But, even with a discharge circuit as described in EP 695,926 there may occasions when a part of the probe e.g. its workpiece contacting stylus, may resonate and charge the capacitor faster than it can be discharged. Also when a true contact is made just after contact bounce the capacitor may be semi-charged. In such an instance the trigger signal will issue more quickly than it would if the capacitor was not charged. This can lead to a lower repeatability of measurement.

Other methods of filtering the output from probes which have an analogue output (usually a varying voltage) have been proposed in U.S. Pat. No. 4,177,568 and European Patent No. 605,140. In U.S. Pat. No. 4,177,568 first and second voltage values must be above a predetermined value before a trigger signal is issued. The second value is taken at a given time interval following the first, said to be about 100 ms. The first value is used to latch coordinates of the machine to which the probe is attached and the second signal is used as a confirmation that contact took place, thus rejecting any spurious signals brought about by contact bounce. No monitoring of the voltage is made between the first and second values.

In EP 605,140 three analogue signals are compared within a time interval and if rising values are detected then a true trigger is assumed to have taken place.

Analogue signals take time to process and not all machines (e.g. machine tools) are capable of storing a latched coordinate value of a first in a series of such values. The time taken to analyse such analogue signals can therefore lead to inaccuracies in the recorded position of a measurement device if latched values cannot be stored.

The known simple R.C. circuits are not readily adjustable to suit potentially varying conditions of use and once "factory set" are not easily alterable.

The present invention provides a touch-trigger probe comprising a workpiece-contact sensor for issuing a workpiece-contact signal and a monitoring device for monitoring the time that the workpiece-contact signal exists, the device providing a trigger signal only when the workpiece-contact signal exists for a predetermined continual period of time.

Preferably the monitoring device is in the form of a programmable processor, more preferably a PIC device.

Preferably the workpiece-contact sensor is a kinematic switch and workpiece contacting stylus.

Preferably the workpiece-contact signal is a voltage threshold and the device converts the signal into a digital form.

It is envisaged that a single design of probe would be used for all applications. For example a CMM, where a relatively vibration free environment exists and accuracy of measurement is important, and at the other extreme a probe for use on a machine tool where there may be extreme vibration and accuracy is only as good as the encoder's accuracy on the machine's slideways. A CMM probe might benefit from a very short time period between a contact a trigger signal, providing accuracy due to the speed of response and few false triggers because there is little vibration. A machine tool probe may require a longer time period between a contact and a trigger signal to eliminate vibrations and, whilst being repeatable, having less accuracy.

An embodiment of the invention provides for altering of the predetermined time e.g. during a user set-up operation.

Embodiments of the invention provide a low-cost low power consumptive probe and a readily changeable time period to trigger the probe, but which period is repeatable despite the possible appearances of contact bounce immediately before workpiece contact takes place.

In patent U.S. Pat. No. 4,769,919 there is recognised a phenomenon whereby an initial shock wave travels up the stylus of a probe almost as soon as it touches a workpiece, prior to the unseating of the (kinematic) electrical contacts. In that patent this shock wave is sensed by a piezo sensor and used to validate the slightly later sensed unseating signal. Large vibrations of both the piezo sensor and the contacts can cause false triggers in this configuration because it may be possible to get the piezo and contacts signals the follow each other when subjected to severe vibration.

According to another aspect the present invention provides a touch-trigger probe comprising a workpiece-contact sensor for issuing a workpiece-contact signal and a monitoring device for monitoring the time that the workpiece-contact signal exists, the device providing a trigger signal only when the workpiece-contact signal exists for a predetermined continual period of time, and the initiation of the monitoring is delayed by a predetermined time interval following a workpiece-contact signal.

In this way a further embodiment of the invention is capable of starting the trigger signal issuing process at the above mentioned initial shock wave rather than at the unseating of the contacts. The said time interval (the delay) can be started at the initial shock wave and, provided no reseating of the contacts is made during the said predetermined period of time, a trigger signal will issue. In this further embodiment the delay in counting is made because it has been found that reseating of the contacts may occur immediately after the shock wave so no counting is done in that period. It has been found that this initial shock wave occurs far more repeatably than the unseating of contacts. Typically the unseating will take place within 2 μm at each occasion whereas the shock wave occurs within 0.1 μm each time the workpiece contact is made. Thus in this embodiment the repeatability of the trigger signal will be far better because its start point (the shock wave) is repeatable also.

Preferred embodiments of the invention will now be described. In the accompanying drawings.

Figure 1:
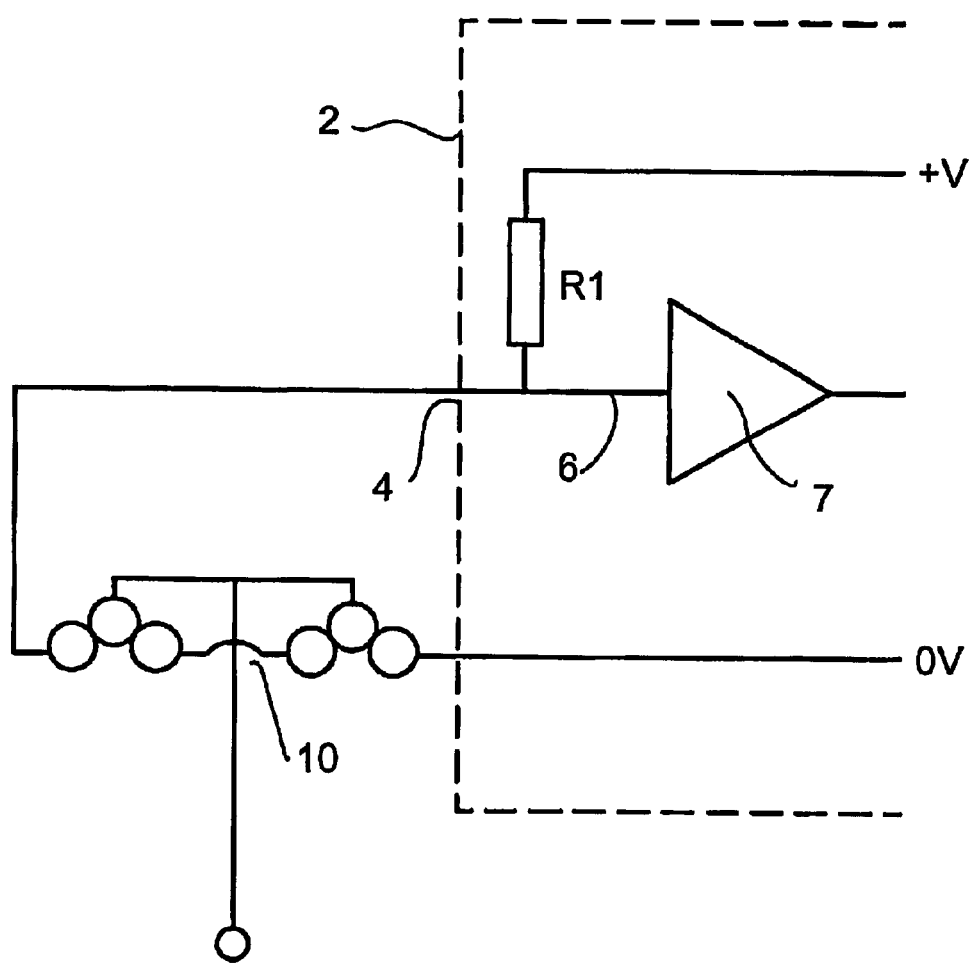
FIG. 1 shows a known probe trigger circuit.
Figure 2A:
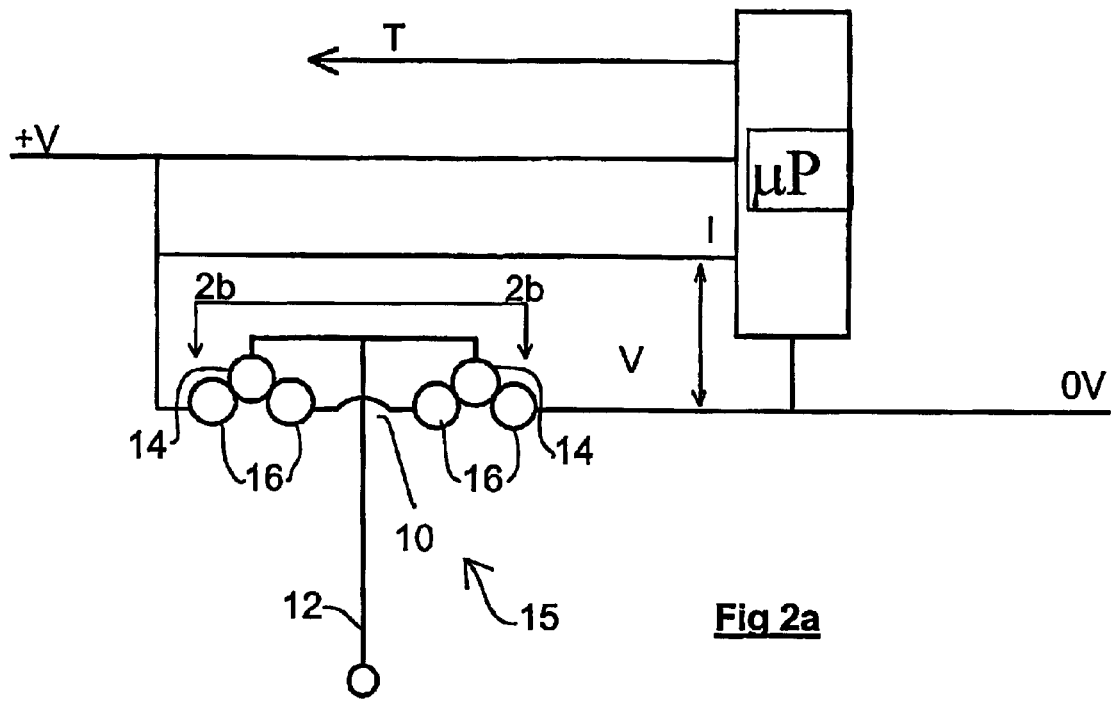
FIG. 2a shows a schematic diagram of a probe circuit according to the invention.
Figure 2B:
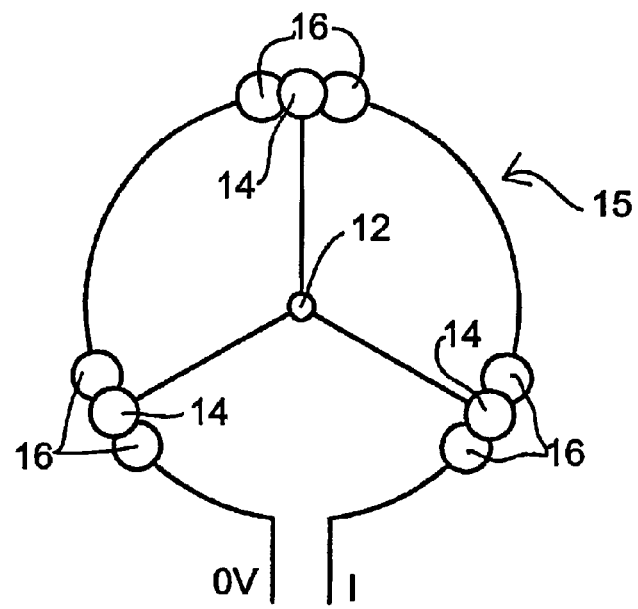
FIG. 2b is a view at plane 2A in FIG. 2.

Referring to FIGS. 2a and 2b, a simplified schematic diagram of a trigger probe employing the invention is shown. In this example the probe has a conventional kinematic seating 10 e.g. of the type described in U.S. Pat. No. 4,153,998. Illustrated here are three rigidly interconnected balls 14 attached to a stylus 12 together forming a workpiece contact sensor 15. Each ball 14 is seatable between a further pair of balls 16 thus forming an electrical contact at its seat. The pairs of balls 16 are electrically interconnected so a kinematic electrical switch is formed. The balls 14 and pairs 16 are lightly urged into engagement so that force on the stylus, from the workpiece contact say, opens the normally closed switch thereby issuing a workpiece contact signal. The voltage across the switch is monitored by a programmable monitoring device in the form of a processor. In this embodiment the processor is a microcontroller μP. The microcontroller μP (in practice a suitably programmed Programmable Interface Controller PIC16F628 by the manufacturer Microchip has proven to be satisfactory) is used to monitor the voltage V by converting voltages above a threshold into a digital "1", values below being "0". This embodiment makes use of the internal clock/counter circuit within the microcontroller in order to determine time e.g. the period Ct during which the signal is converted into continuous "1"s. In this instance the signal is said to exist when it is a "1", even though a voltage below the threshold may be present across the sensor 15.

The sampling rate of processors generally is now in the order of MHz so in this application monitoring of the voltage is regular and virtually continuous.

Despite the urging together of the seated balls the switch may vibrate and cause contact bounce. This could cause the voltage across the switch to rise and thereby cause the probe to produce a trigger signal via output T.

However, the microcontroller is able to ignore contact bounce, i.e. voltages which momentarily rise above a predetermined threshold Vt. This is done, in one embodiment as follows with reference to FIG. 3:—when the voltage does rise above the threshold and is converted to a "1" signal the microcontroller starts an internal counter for a period C. This counter runs only while the "1" signal is in existence and resets to zero when the signal ceases i.e. when the voltage V drops below the threshold Vt.

Figure 3:
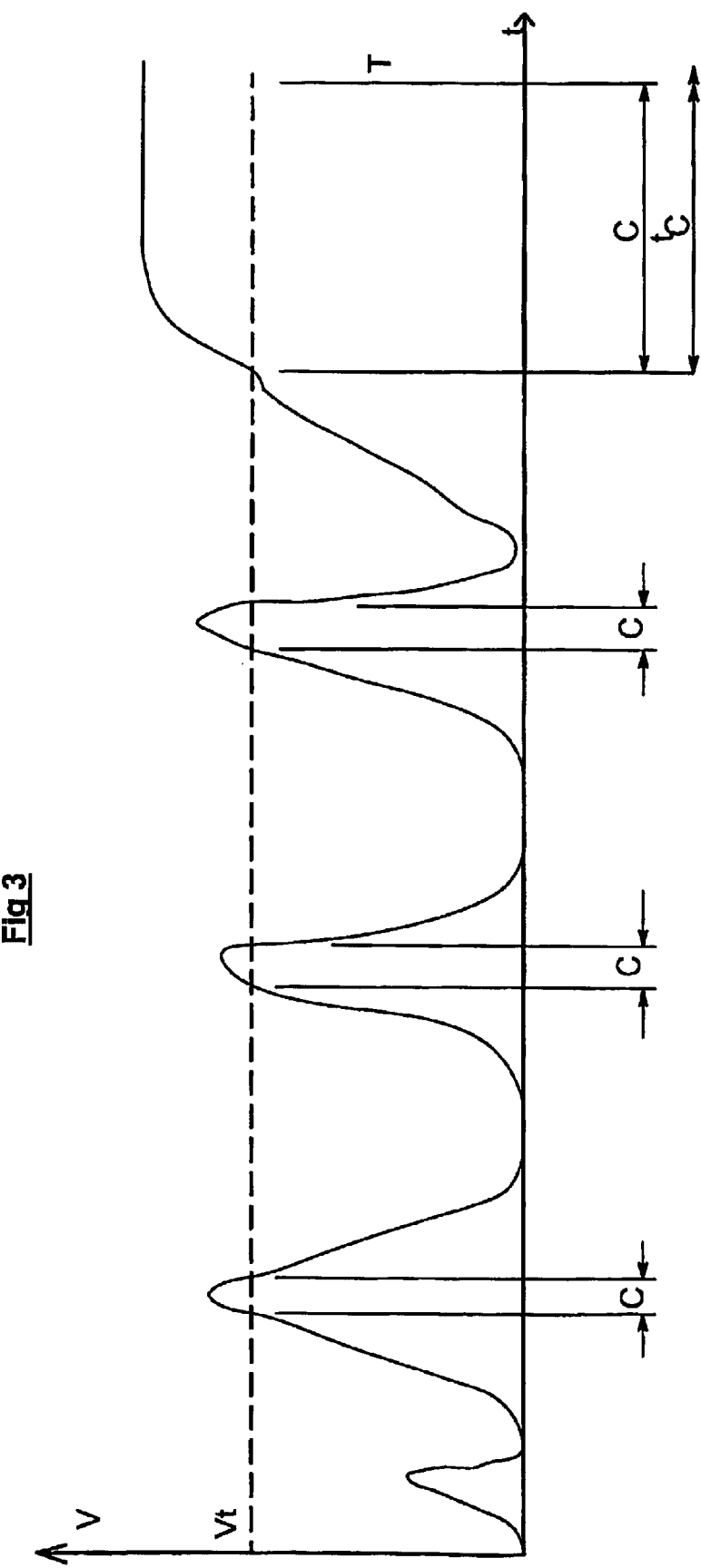
FIG. 3 shows a graph illustrating one mode of operation of the invention.

In FIG. 3 the first two occasions that the voltage rises above Vt are caused by contact bounce and of relatively short duration. On the third and fourth occasion workpiece contact is made (the third rise is due to an initial shock wave mentioned above). The workpiece contact produces a longer or constant signal. Provided the "1" does not cease for a period Ct then a trigger signal T is issued by the microcontroller. In practice this time period Ct is set to between 3 ms and 15 ms. If this period elapses without the voltage dropping below the threshold Vt then stylus contact with the workpiece is assumed to have taken place, and then a trigger signal arrests movement of the probe and usually initiates a position recording step so that measurement can take place.

In this example the microcontroller is re-programmable so that the time period can be altered. This feature permits the minimum time period to be set. Thus on a stable CMM with little vibration a short period can be set and on more vibratory machines e.g. a machine tool, a longer period can be set. In practice a period of about 7 ms has proven to be about right for most applications.

Once the trigger signal has been issued an internal counter in the microcontroller is reset to zero ready for the next voltage increase.

The microcontroller is used to control other functions in this example e.g. operation of an optical link to a base station. The microcontroller has a user set-up mode which allows the predetermined time periods e.g. Ct and intervals e.g. Ci [see below] to be user adjusted.

It is envisaged that the microcontroller will be housed within the body of the probe and that the probe will be battery-operated and wirelessly (e.g. optically) linked to a base station, however a remote microcontroller is possible.

Figure 4:
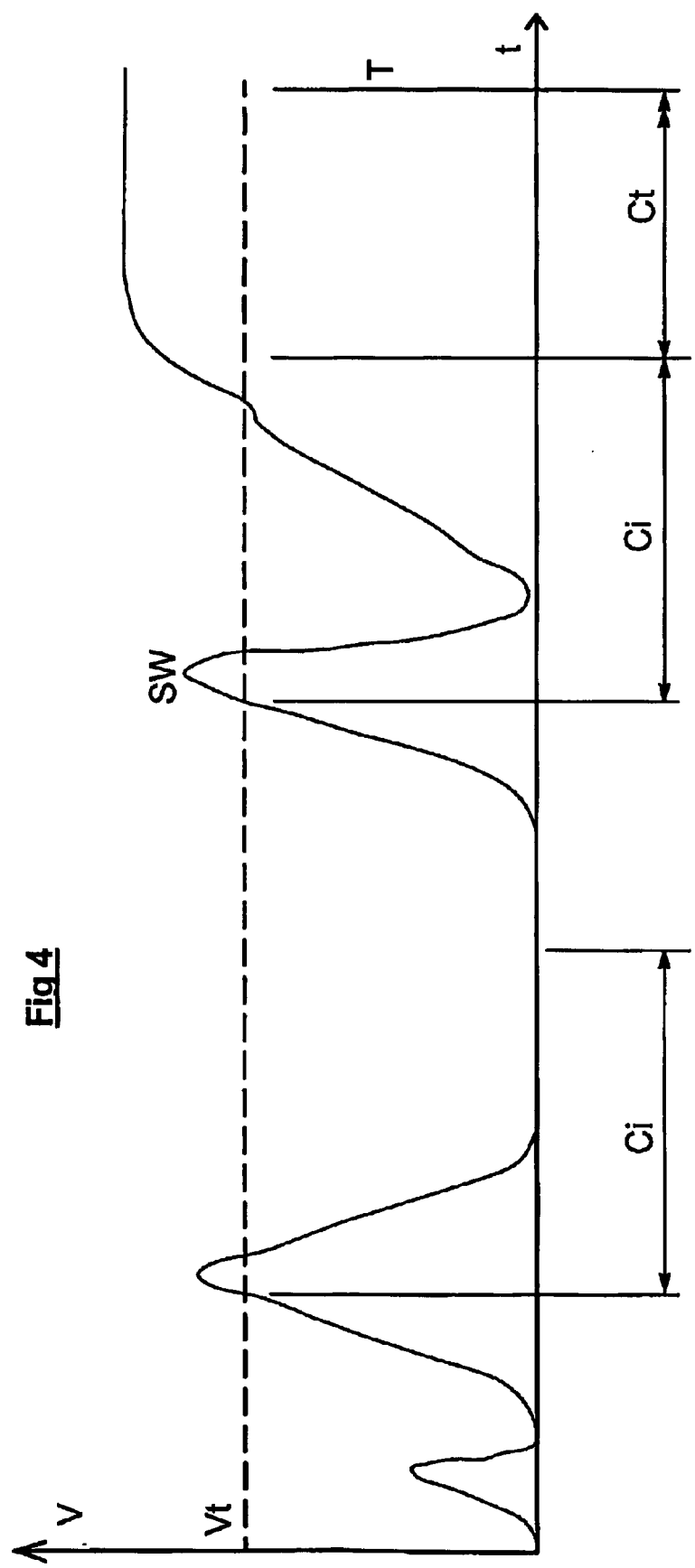
FIG. 4 shows a graph illustrating another mode of operation of the invention.

FIG. 4 illustrates an alternative mode of operation of the probe described above. In this embodiment the programmed monitored time period Ct is delayed and started only after an interval Ci. The interval Ci when the voltage V rise above the threshold value Vt (either because there was vibration, there was an initial shock wave, or because workpiece contact has come about). If the voltage is not above the threshold Vt at the end of time interval Ci then no period Ct will be counted. In the illustration contact bounce occurs at the first occasion that the voltage rises above Vt but no subsequent work contact is made so the voltage will not be continuously above Vt after the time interval Ci for the time period Ct. In contrast, following shock wave SW the time Ci will start to be counted and the following work contact voltage rise will result in a continues voltage Vt for the predetermined time period Ct. Again provided the voltage does not drop below the threshold value during the time period Ct then a trigger signal will issue at the end of that period. The voltage during the interval Ci is unimportant. Thus in this mode the period Ct starts after what is an initial shock wave SW rather than, as illustrated in FIG. 3, the unseating of the contacts caused by workpiece contact. So, as discussed above, the repeatability of measurement initiated in this way is much improved. In practice the time interval Ci is preset at about 10 to 500 μsec, and reprogramming of the microcontroller to alter this interval is possible to suit the use to which the probe may be put.

This mode gives immunity also to false triggers caused by vibration. If for some reason no shock wave occurs (e.g. because very slow workpiece contact is made) the trigger signal will still issue because the voltage will rise above the threshold when the contacts are unseated and remain above the threshold during the time Ci+Ct. A trigger signal will issue at the end of that time.

It will be appreciated that many variations are possible within the ambit of the invention. For example, the switch illustrated may be replaced by a different touch sensor and may be an analogue device, but having a threshold value Vt at which the microcontroller starts counting. The switch shown may be replaced by a simple on/off switch or some other touch sensitive arrangement e.g. a strain sensitive arrangement or a piezo sensor. The presently illustrated kinematic switch 15 has the advantage of being operable in three dimensions and operate at a repeatable triggering position. A counter internal to the microcontroller is described. Such an arrangement saves space and costs. However, it is possible to use a conventional counter having an oscillator and dividing circuits which will start timing and issue a trigger signal after a predetermined period of constant signal from a touch sensor.

Moreover, whilst a PIC is shown as the monitoring device, other processors or circuits could be used which carry out the same function e.g a field-programmable gate array, or an application specific integrated circuit.

What is claimed is:

1. A touch-trigger probe comprising a workpiece-contact sensor for issuing a workpiece-contact signal and a monitoring device for monitoring an amount of time that the workpiece-contact signal exists, the monitoring device providing a trigger signal after the workpiece-contact signal exists for a predetermined continual period of tune monitored by the device, wherein initiation of the monitoring begins after a predetermined time interval following a time when the workpiece-contact signal initially issued.

2. The touch-trigger probe as claimed in claim 1, wherein the monitoring device is a processor.

3. The touch-trigger probe as claimed in claim 2, wherein the processor is a programmable PIC microcontroller.

4. The touch-trigger probe as claimed in claim 1, wherein the workpiece-contact sensor is a kinematic switch together with a workpiece contacting stylus.

5. The touch-trigger probe as claimed in claim 1, wherein:
   the workpiece-contact signal exists when the workpiece-contact signal attains a voltage value which is beyond a threshold value, and
   the monitoring device converts the workpiece-contact signal into a numerical value that has one integer value when the workpiece-contact signal is above the threshold value and another integer value when below the threshold value.

6. The touch-trigger probe as claimed in claim 1, wherein the predetermined continual period and the predetermined time interval are each alterable.

7. The touch-trigger probe as claimed in claim 6, wherein the alteration is possible during a user set-up operation.

8. A touch-trigger probe comprising:
   a workpiece-contact sensor for issuing a workpiece-contact signal when a voltage corresponding to a state of a workpiece-contact sensor exceeds a predetermined threshold; and
   a monitoring device for monitoring the workpiece-contact signal, the monitoring device comprising a processor, wherein:
   the monitoring device monitors an amount of time that the workpiece-contact signal continuously exists, and
   the monitoring device provides a trigger signal after the workpiece-contact signal exists for a predetermined continual period of time.

9. The touch-trigger probe as claimed in claim 8, wherein the processor is a programmable processor such as a PIC microcontroller.

10. The touch-trigger probe as claimed in claim 8, wherein the processor is housed within the body of the probe.

11. The touch-trigger probe as claimed in claimed 8, wherein after the monitoring device determines that a first predetermined time period has passed from the issuance of the workpiece-contact signal, the monitoring device monitors the workpiece-contact signal to determine whether the workpiece-contact signal continuously exists for a second predetermined time period continuously after expiration of the first predetermined time period.

12. The touch-trigger probe as claimed in claim 11, wherein the monitoring device issues a trigger signal after the monitoring device determines that the workpiece-contact signal continuously existed for the first and second predetermined time periods.

13. The touch-trigger probe as claimed in claim 8, wherein the monitoring device issues a trigger signal after the monitoring device determines that the workpiece-contact signal continuously existed for a predetermined time period.

14. A method for operating a touch-trigger probe, the method comprising:
   issuing a workpiece-contact signal from a workpiece contact sensor when a voltage corresponding to a state of the workpiece-contact sensor exceeds a predetermined threshold;
   with a monitoring device, monitoring an amount of time that the workpiece-contact signal continuously exists;
   determining whether the workpiece-contact signal being monitored has continuously existed for a predetermined period of time; and
   issuing a trigger signal after determining that the workpiece-contact signal continuoulsy existed for the predetermined period of time.

15. The method of claim 14, wherein monitoring an amount of time that the workpiece-contact signal continuously exists occurs if the issued workpiece-contact signal continuously existed for an initial predetermined period of time.

* * * * *

UNITED STATES PATENT AND TRADEMARK OFFICE
CERTIFICATE OF CORRECTION

PATENT NO. : 6,941,671 B2  Page 1 of 1
APPLICATION NO. : 10/488207
DATED : September 13, 2005
INVENTOR(S) : Jonathan P. Fuge It is certified that error appears in the above-identified patent and that said Letters Patent is hereby corrected as shown below:

Column 5, line 29 please change "tune" to --time--

Signed and Sealed this

Eighth Day of May, 2007

JON W. DUDAS
*Director of the United States Patent and Trademark Office*